United States Patent
Capron et al.

(10) Patent No.: US 8,184,044 B1
(45) Date of Patent: May 22, 2012

(54) SUPER RESOLUTION RADAR IMAGE EXTRACTION PROCEDURE

(75) Inventors: Barbara A. Capron, Sammamish, WA (US); Claudio Gilbert Parazzoli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/103,907

(22) Filed: May 9, 2011

Related U.S. Application Data

(63) Continuation-in-part of application No. 12/723,098, filed on Mar. 12, 2010.

(51) Int. Cl.
*G01S 13/00* (2006.01)

(52) U.S. Cl. ........................ 342/179; 342/175

(58) Field of Classification Search .................. 342/175, 342/179
See application file for complete search history.

(56) References Cited

U.S. PATENT DOCUMENTS

| | | | | |
|---|---|---|---|---|
| 3,720,950 A * | 3/1973 | Vehrs, Jr. | ........................ | 342/162 |
| 3,851,299 A * | 11/1974 | Wood | ........................ | 367/90 |
| 4,608,569 A * | 8/1986 | Dickey et al. | ........................ | 342/384 |
| 4,716,414 A * | 12/1987 | Luttrell et al. | ........................ | 342/179 |
| 4,768,156 A * | 8/1988 | Whitehouse et al. | ........................ | 382/279 |
| 4,963,877 A * | 10/1990 | Wood et al. | ........................ | 342/25 A |
| 5,227,801 A * | 7/1993 | Pierce | ........................ | 342/192 |
| 5,243,351 A * | 9/1993 | Rafanelli et al. | ........................ | 342/351 |
| 5,774,091 A * | 6/1998 | McEwan | ........................ | 342/387 |
| 5,805,110 A * | 9/1998 | McEwan | ........................ | 342/387 |
| 6,088,295 A * | 7/2000 | Altes | ........................ | 367/103 |
| 6,163,293 A * | 12/2000 | Sezai | ........................ | 342/196 |
| 6,344,893 B1 * | 2/2002 | Mendlovic et al. | ........................ | 356/3.14 |
| 6,777,684 B1 * | 8/2004 | Volkov et al. | ........................ | 250/341.1 |
| 7,003,177 B1 * | 2/2006 | Mendlovic et al. | ........................ | 382/299 |
| 7,339,521 B2 * | 3/2008 | Scheidemann et al. | ........................ | 342/379 |
| 7,385,552 B2 * | 6/2008 | Archer et al. | ........................ | 342/179 |
| 7,450,470 B2 * | 11/2008 | Wilson | ........................ | 367/68 |
| 7,609,198 B2 * | 10/2009 | Chang | ........................ | 342/59 |
| 7,843,379 B2 * | 11/2010 | Menzer et al. | ........................ | 342/118 |
| 7,889,120 B2 * | 2/2011 | Flasza | ........................ | 342/124 |
| 7,978,120 B2 * | 7/2011 | Longstaff | ........................ | 342/22 |

(Continued)

OTHER PUBLICATIONS

Basano, Lorenzo and Ottonello, Pasquale, "A conceptual experiment on single-beam coincidence detection with pseudothermal light," Optics Express, Sep. 17, 2007, vol. 15, No. 19.

(Continued)

*Primary Examiner* — Thomas Tarcza
*Assistant Examiner* — Peter Bythrow
(74) *Attorney, Agent, or Firm* — Vista IP Law Group LLP; Cynthia A. Dixon

(57) ABSTRACT

A system, method, and apparatus for a super resolution radar image extraction procedure are disclosed. The super-resolution imaging radar (SRIR) system involves a pulse signal generator, an array bucket detector, an ancilla beam detector, and a coincidence circuit. The pulse signal generator propagates N number of bursts of radio frequency (RF) energy, where each burst contains M number of dithered pulses. The pulses are propagated towards an object of interest and the ancilla beam detector. The array bucket detector collects pulses that are reflected from the object. The ancilla beam detector scans in a direction of the dithered pulses, and collects the dithered pulses. The coincidence circuit calculates a cross-time correlation function from the pulses that are collected by the array bucket detector and the ancilla beam detector. The coincidence circuit sums cross-time correlation function results to generate pixels of an image of the object.

20 Claims, 4 Drawing Sheets

U.S. PATENT DOCUMENTS 8,022,860 B1* 9/2011 Mukai et al. ............. 342/60
8,102,299 B2* 1/2012 Young et al. ............ 342/25 A

OTHER PUBLICATIONS

Chan, Kam Wai Clifford, et al., "High-Order Thermal Ghost Imaging," The Institute of Optics, University of Rochester, 2009, Rochester, New York.

Chen, Xi-Hao, et al., "Lenseless ghost imaging with true thermal light," Optics Letters, Mar. 1, 2009, pp. 695-697, vol. 34, No. 5.

Shih, Yanhua, "Ghost imaging," Quantum Communications and Quantum Imaging at the SPIE Optics + Photonics Symposium, Aug. 2009, San Diego, California. DOI: 10.1117/2.1200907.1717.

Bromberg, Yaron, et al., "Ghost imaging with a single detector," Physical Review A, May 2009, vol. 79, No. 5. DOI: 10.1103/PhysRevA.79.053840.

Freeman, Tony, "What is Imaging Radar?" Jet Propulsion Laboratory, Jan. 26, 1996, retrieved from http://southport.jpl.nasa.gov/desc/imagingradarv3.html Feb. 17, 2010.

"Synthetic aperture radar," Wikipedia, the free encyclopedia, retrieved from http://en.wikipedia.org/wiki/Synthetic_aperture_radar Feb. 17, 2010.

"Inverse synthetic aperture radar," Wikipedia, the free encyclopedia, retrieved from http://en.wikipedia.org/wiki/Inverse_synthetic_aperture_radar Feb. 17, 2010.

* cited by examiner

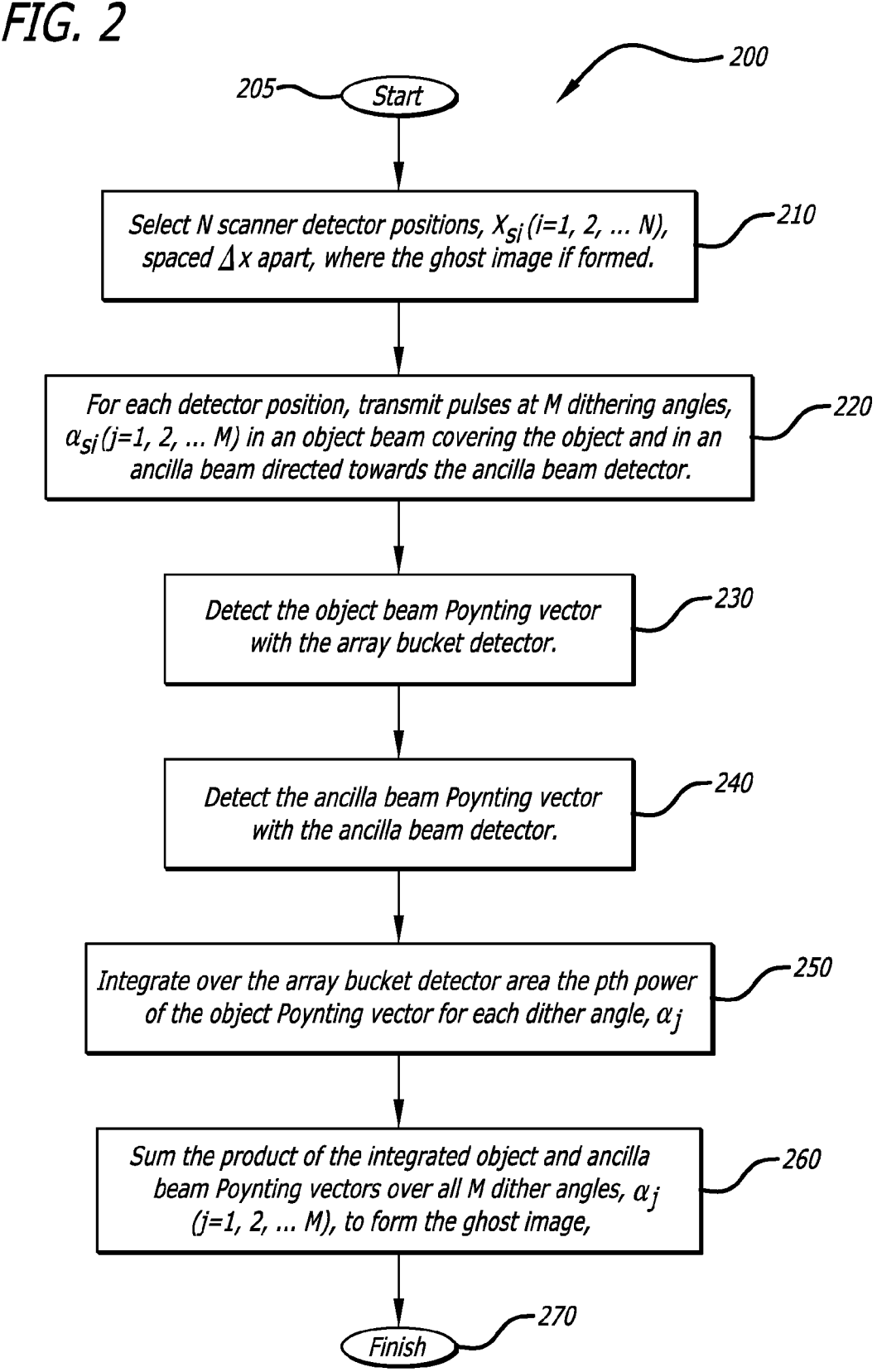

FIG. 4

| Quantum GI | SRIR |
|---|---|
| Photon | Single RF pulse |
| K dithering due to crystal finite length | RF pulse dithering in the burst |
| Scanning of the $D_1$ detector | Multiple bursts |
| Coincident Counter | Digital post processing |
| p entangled photons | p power in the Poynting vector post process |
| Image resolution ~ 2p | Image resolution ~ 2p |
| SNR improvement | ? |

SUPER RESOLUTION RADAR IMAGE EXTRACTION PROCEDURE

CROSS-REFERENCE TO RELATED APPLICATION

This application is a Continuation-In-Part application of, and claims the benefit of U.S. patent application Ser. No. 12/723,098, filed Mar. 12, 2010, which is hereby incorporated by reference in its entirety.

BACKGROUND

The present disclosure relates to super-resolution imaging radar (SRIR). In particular, it relates to a super resolution radar image extraction procedure.

SUMMARY

The present disclosure relates to a system, method, and apparatus for a super resolution radar image extraction procedure. In particular, the disclosed super-resolution imaging radar (SRIR) system involves a pulse signal generator, an array bucket detector, an ancilla beam detector, and a coincidence circuit. The pulse signal generator propagates N number of bursts of radio frequency (RF) energy, where each burst contains M number of dithered pulses. The pulses are propagated towards an object of interest and the ancilla beam detector. The array bucket detector collects pulses that are reflected from the object. The ancilla beam detector scans in a direction of the dithered pulses, and collects the dithered pulses. The coincidence circuit calculates a cross-time correlation function from the pulses that are collected by the array bucket detector and the ancilla beam detector. The coincidence circuit sums cross-time correlation function results to generate pixels of an image of the object.

In one or more embodiments, the M number of dithered pulses sequentially illuminate the object. In at least one embodiment, the N number of bursts is inversely proportional to the granularity of the image of the object. In some embodiments, the array bucket detector comprises a plurality of RF antenna elements. In one or more embodiments, Poynting vectors of the reflected pulses that are collected by the array bucket detector are stored in digital form. In some embodiments, the cross-time correlation function is computed using the data that is stored in digital form.

In at least one embodiment, the cross-time correlation function is related to the image pixel intensity at a specific scanning location of the ancilla beam detector. In one or more embodiments, the cross-time correlation function is given by:

$$P(\alpha_j, x_{is}, p) = I_{Bk}(\alpha_j, p) P_{An}(\alpha_j, x_{is}) \Delta x$$

where, $\alpha_j$=angle of each dithered pulse for j=1, 2, ... M; $x_{is}$=location of the ancilla beam detector for i=1, 2, ... N; p=power; $I_{BK}$=integrated Poynting vector of the pulses collected by the array bucket detector; $P_{An}$=Poynting vector of the pulses collected by the ancilla beam detector; and $\Delta x$=spacing between the ancilla beam detector locations. In some embodiments, the integrated Poynting vector of the pulses collected by the array bucket detector is given by:

$$I_{Bk}(\alpha_j, p) = \int_{-\infty}^{+\infty} [P_{Bk}(y)]^p \, dy$$

where, $\alpha_j$=angle of each dithered pulse for j=1, 2, ... M; p=power; $P_{BK}$=Poynting vector of the pulses collected by the array bucket detector; and y=cross section of the object.

In one or more embodiments, the ancilla beam detector is virtual. In some embodiments, the pulses are reflected from the object to the array bucket detector through a lens. In at least one embodiment, the pulses are propagated to the ancilla beam detector through a lens.

In at least one embodiment, a method for extracting super-resolution images involves providing a super-resolution imaging radar (SRIR) that comprises a pulse signal generator, an array bucket detector, an ancilla beam detector, and a coincidence circuit. The method further involves propagating, with the pulse signal generator, N number of bursts of radio frequency (RF) energy. Each burst contains M number of dithered pulses. The pulses are propagated towards an object of interest and the ancilla beam detector. Further, the method involves collecting, with the array bucket detector, pulses that are reflected from the object. Also, the method involves scanning the ancilla beam detector in a direction of the dithered pulses. In addition, the method involves collecting, with the ancilla beam detector, the dithered pulses. Additionally, the method involves calculating, with the coincidence circuit, a cross-time correlation function from the pulses that are collected by the array bucket detector and the ancilla beam detector. Further, the method involves summing, with the coincidence circuit, cross-time correlation function results to generate pixels of an image of the object.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 2 shows a flow chart displaying the operation procedure for the SRIR of FIG. 1, in accordance with at least one embodiment of the present disclosure.

FIG. 4 shows a table comparing characteristics of quantum optical ghost imaging (GI) with characteristics of the disclosed SRIR.

DESCRIPTION

Figure 1:
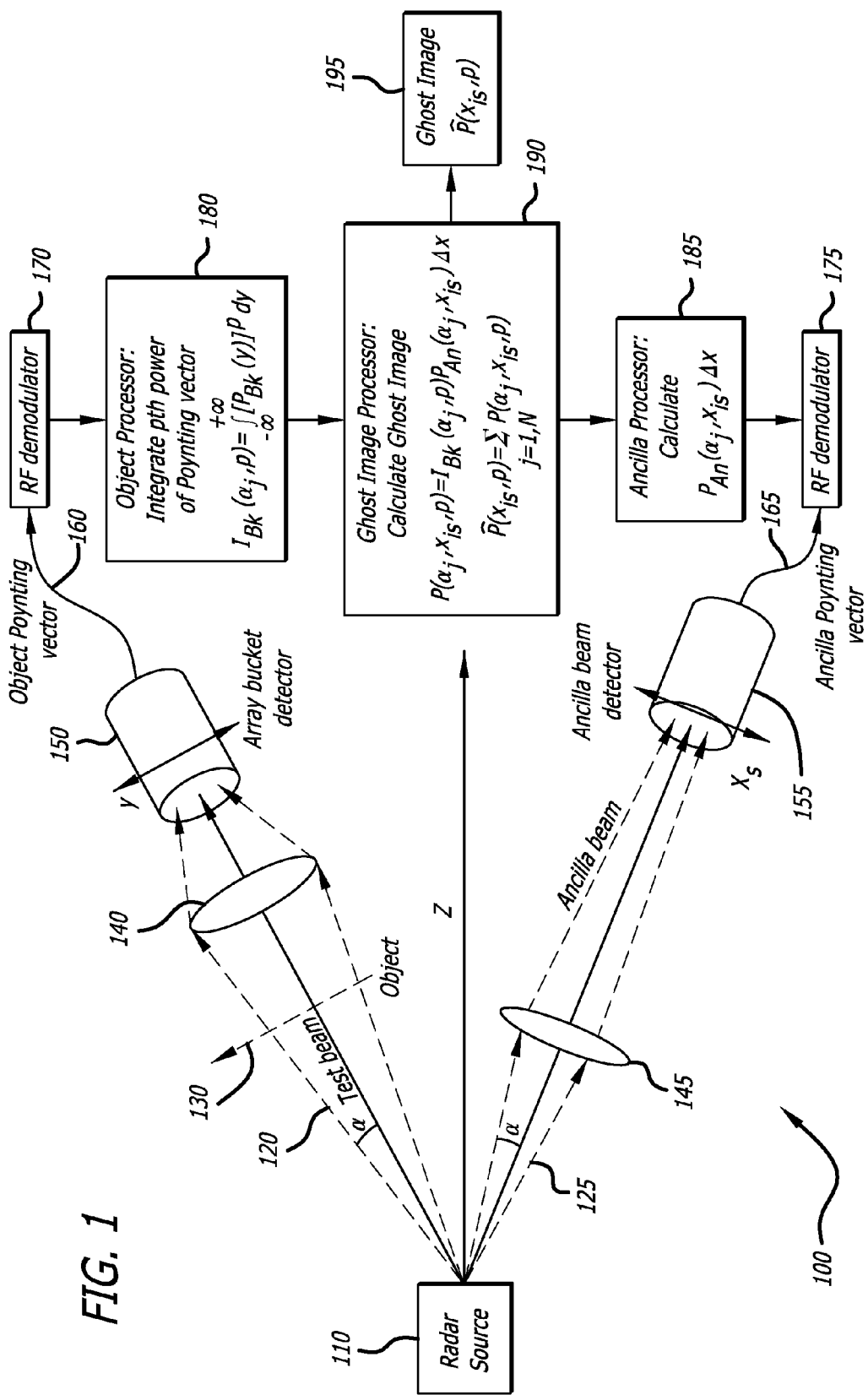
FIG. 1 illustrates a schematic diagram of a super-resolution imaging radar (SRIR), in accordance with at least one embodiment of the present disclosure.

The methods and apparatus disclosed herein provide an operative system for super resolution imaging radar (SRIR). Specifically, this system relates to super-resolution imaging radar that uses high order imaging in order to achieve enhanced resolution. In particular, this system employs a super resolution radar image extraction procedure.

The disclosed system modifies a technique known as "ghost imaging" in the optical regime, and adapts it for use with high-resolution imaging radar. This modified technique employs the $p^{th}$ order correlation (where p=1, 2, ... ) of the Poynting vectors of the electric fields in the microwave or radio frequency (RF) regime to form an image, which has improved resolution over images generated by current state-of-the-art imaging radar.

Imaging radar works very much like a flash camera in that it provides its own light to illuminate an area on the ground, and it takes a snapshot picture. But unlike a camera, imaging radar uses radio wavelengths. A flash camera sends out a pulse of light (i.e. the flash), and records on film the light that is reflected back at it through the camera lens. Instead of using a camera lens and film, imaging radar employs a radar antenna and digital computer tapes and/or memory to record the images. Imaging radar measures the strength and round-trip time of the microwave signals that are emitted by the radar antenna and reflected off a distant surface or object. As such, a radar image only shows the light that was reflected back towards the radar antenna.

Currently, there are two main types of imaging radar that are used to generate high-resolution radar images. These two main types are synthetic aperture radar (SAR) and inverse synthetic aperture radar (ISAR). The first of these two types, synthetic aperture radar, is a form of radar in which multiple radar images are processed to yield higher-resolution images than would be possible by using conventional means. Synthetic aperture radar uses (1) one or more antennas mounted on a moving platform, such as an airplane or spacecraft, to illuminate a target area; (2) uses many low-directivity small stationary antennas that are scattered over an area near the target area; or (3) uses combinations thereof. In the case where many low-directivity small stationary antennas are employed, the many echo waveforms received at the different antenna positions are post-processed to resolve the target area.

As such, a disadvantage of synthetic aperture radar is that since synthetic aperture radar can only be implemented by using one or more moving antennas over relatively immobile targets, using multiple stationary antennas over a relatively large area, or using combinations thereof, it requires a high cost, complex system. Additional disadvantages of synthetic aperture radar include the fact that it requires a lot of data storage and the fact that it requires much post-processing in order to generate the resulting image.

The second of the two main types of imaging radar that are used to generate high-resolution radar images is inverse synthetic aperture radar. Inverse synthetic aperture radar is used to generate a two-dimensional (2D) high resolution image of a target. Inverse synthetic aperture radar images are produced by rotating the target and processing the resultant doppler histories of the scattering centers.

During operation of an inverse synthetic aperture radar, if the target rotates in the azimuth direction at a constant rate through a small angle, scatters will approach or recede from the radar at a rate depending on the cross range position, which is the distance normal to the radar line of sight with the origin being located at the center of the target axis of rotation. The rotation will result in the generation of cross range dependent doppler frequencies, which can be sorted by a Fourier transform. This operation is equivalent to the generation of a large synthetic aperture phased array antenna, which is formed by the coherent summation of the receiver outputs for the varying target and/or antenna geometries. As such, if the target is rotated through small angles, the resulting inverse synthetic aperture radar image is the two-dimensional.

Fourier transform of the received signal as a function of frequency and the target aspect angle.

Conversely, if the target is rotated through large angles, the doppler frequency history of a scatter is non-linear and follows a sine-wave trajectory. The doppler frequency history cannot be processed directly by a Fourier transform because the smeared doppler frequency history will result in a loss of cross range resolution. The maximum angle of rotation that can be processed by an unmodified Fourier transform is determined by the constraint that the aperture phase error across the synthesized aperture should vary by less than a specified arbitrary amount, which is usually forty-five (45) degrees.

Inverse synthetic aperture radar has a few disadvantages. One disadvantage is that inverse synthetic aperture radar requires motion, which is usually a rotation, between the image and the sensor. Other disadvantages include the fact that inverse synthetic aperture radar requires a lot of data storage and the fact that it requires a lot of post-processing in order to obtain the resulting image of the target.

It should be noted that both of the aforementioned types of imaging radar, synthetic aperture radar and inverse synthetic aperture radar, are limited to using second order correlations of the electric fields in order to produce the resulting image. Currently, there are no known techniques that use higher order correlations for radar imaging. The system of the present disclosure employs higher order correlations between electromagnetic fields at radar frequencies to form images. By employing higher order imaging, the resolution is enhanced due to the mathematical superposition of many exponential products.

The disclosed technique is similar to "coincidence imaging" or ghost imaging in the optical regime. However, a number of modifications are required in order to be able to employ the technique for a radar configuration. Ghost imaging (GI) is an imaging technique that exploits the quantum nature of light. In ghost imaging, an object is imaged through the light which illuminates the object and the light that is collected by a single-pixel detector that has no spatial resolution (i.e. a bucket detector). This is accomplished through the use of two spatially correlated beams. One of the beams illuminates the object, and the photons transmitted by the object are collected by the bucket detector. The other beam impinges on a multipixel detector (e.g., a charge-coupled device (CCD) camera) without ever passing through the object. Nevertheless, by correlating the intensities measured by the bucket detector with the intensities of each pixel in the multipixel detector, an image of the object is reconstructed.

The system of the present disclosure uses a technique that is similar to the technique used in ghost imaging. The main difference between these two techniques is that the system of the present disclosure images an object through the use of radio frequency (RF) energy and, conversely, ghost imaging images an object through the use of beams of light. A detailed discussion of the technique employed by the system of the present disclosure follows.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 illustrates a schematic diagram of a super-resolution imaging radar (SRIR) 100, in accordance with at least one embodiment of the present disclosure. In this figure, a RF radar source 110 transmits N number of bursts of M number of dithered pulses in two matching fan beams (i.e. an object test beam 120 and an ancilla beam 125).

The object test beam 120 is directed toward an object of interest 130. Reflected pulses from the object 130 are focused by a lens 140. An array bucket detector 150 collects the focused pulses 120. In one or more embodiments, the array bucket detector 150 comprises a plurality of RF antenna elements. Various types of RF antenna elements may be employed for the array bucket detector 150 of the present disclosure. In some embodiments, the Poynting vectors of the reflected pulses 150 that are collected by the array bucket detector 150 are stored in digital form.

The ancilla beam 125 is focused by a lens 145. An ancilla beam detector 155 detects the focused ancilla pulses 125. In one or more embodiments, the ancilla beam 125, ancilla lens 145, and ancilla beam detector 155 are all virtual. It should be noted that in other embodiments, the disclosed SRIR 100 may or may not include lens 140 and/or lens 145.

During operation of the SRIR 100, each burst contains M number of dithered pulses with deflections $\alpha_j$ (where j=1, 2, . . . M) to cover the entire object of interest 140. The N number of bursts is inversely proportional to the granularity of the resultant image of the object 130. The ancilla beam detector 155 is scanned up and down by a distance $\Delta x$ between bursts.

The array bucket detector 150 and the ancilla beam detector 155 each output an output signal. The two output signals represent the object Poynting vector 160 and the ancilla Poynting vector 165, respectively. The Poynting vectors 160, 165 are demodulated by RF demodulators 170, 175. An object processor 180 integrates the $p^{th}$ power of the object Poynting vector 160 over the array bucket detection extent y, and an ancilla processor 185 calculates a similar quantity for the ancilla beam 125. A ghost image processor 190 cross-correlates these resultant values by forming their product for each $\alpha$ angle, and then summing these products for all $\alpha$ angles, as the equations show, to produce the ghost image 195. Each burst is used to generate one pixel of the resulting image. Subsequent bursts fully paint an image of the object 130. As such, the number of bursts, N, will determine the granularity of the final image. It should be noted that in some embodiments, a single processor is employed for the object processor 180, the ancilla processor 185, and the ghost image processor 190.

In particular, the ghost image is formed from:

$$\tilde{P}(x_{is}, p) = \sum_{j=1,N} P(\alpha_j, x_{is}, p)$$

where the cross-time correlation function is:

$$P(\alpha_j, x_{is}, p) = I_{Bk}(\alpha_j, p) P_{An}(\alpha_j, x_{is}) \Delta x$$

and the integrated Poynting vector of the array bucket detector 150 is:

$$I_{Bk}(\alpha_j, p) = \int_{-\infty}^{+\infty} [P_{Bk}(y)]^p \, dy$$

and the ancilla beam detector 155 output is:

$$P_{An}(\alpha_j, x_{is}) \Delta x$$

where $x_{is}$ is the location of the ancilla beam detector 155, which are spaced $\Delta x$ apart; and i is the burst index that corresponds to location $x_{is}$ (where i=1, 2, . . . N); and N is the number of bursts. Each burst contains M number of dither angles $\alpha_j$ (where j=1, 2 . . . M) covering the object. The functions P are Poynting vectors, where $P_{Bk}$ and $P_{An}$ correspond to the object test beam 120 and the ancilla beam 125, respectively. The object Poynting vector 160 is raised to the $p^{th}$ power, which impacts the image resolution.

FIG. 2 shows a flow chart displaying the operation procedure for the SRIR of FIG. 1, in accordance with at least one embodiment of the present disclosure. In particular, FIG. 2 provides the process for forming the ghost image from RF illumination of the object. The process starts 205 by selecting a set of N number of ancilla beam scanner detector positions, $x_{is}$ (where i=1, 2 . . . N), spaced $\Delta x$ apart, where the ghost image will be formed 210. Then, at each detector position, M pulses at dithering angles, $\alpha_j$ (where j=1, 2, . . . M), are transmitted in an object beam directed to cover the object and an ancilla beam directed towards the ancilla beam detector 220. The object beam Poynting vector is detected by the array bucket detector 230, and the ancilla beam Poynting vector is detected by the ancilla beam detector 240. The $p^{th}$ power object Poynting vector is integrated over the array bucket detector 250 area. The products of the integrated object Poynting vector and the ancilla beam Poynting vector, taken at each angle, $\alpha_j$ (where j=1, 2, . . . M), are summed over all M angles to form the ghost image. After the ghost image is formed, the process ends 270.

Figure 3A:
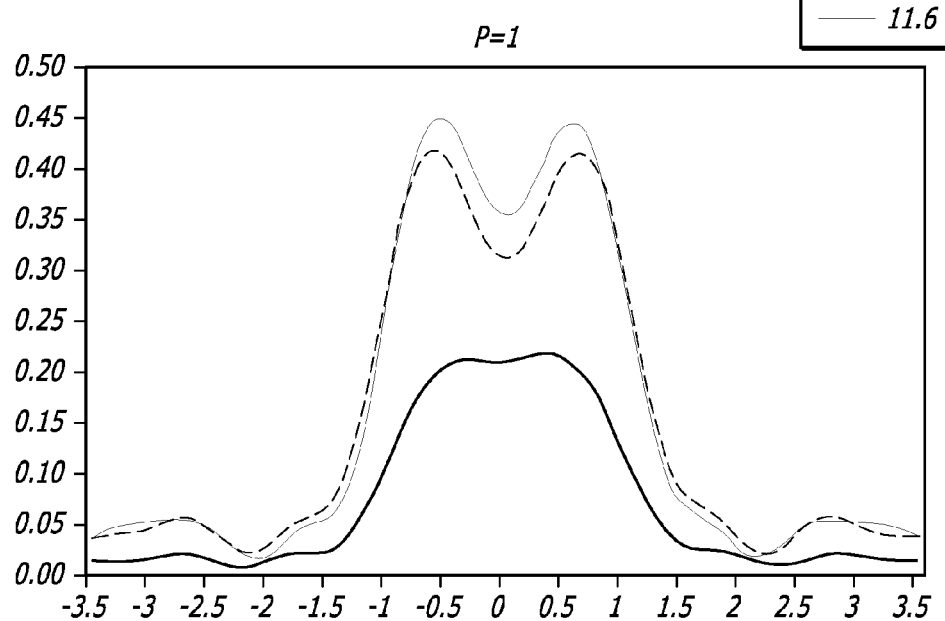
FIGS. 3A and 3B show test data from simulations of the SRIR of FIG. 1, in accordance with at least one embodiment of the present disclosure.
Figure 3B:
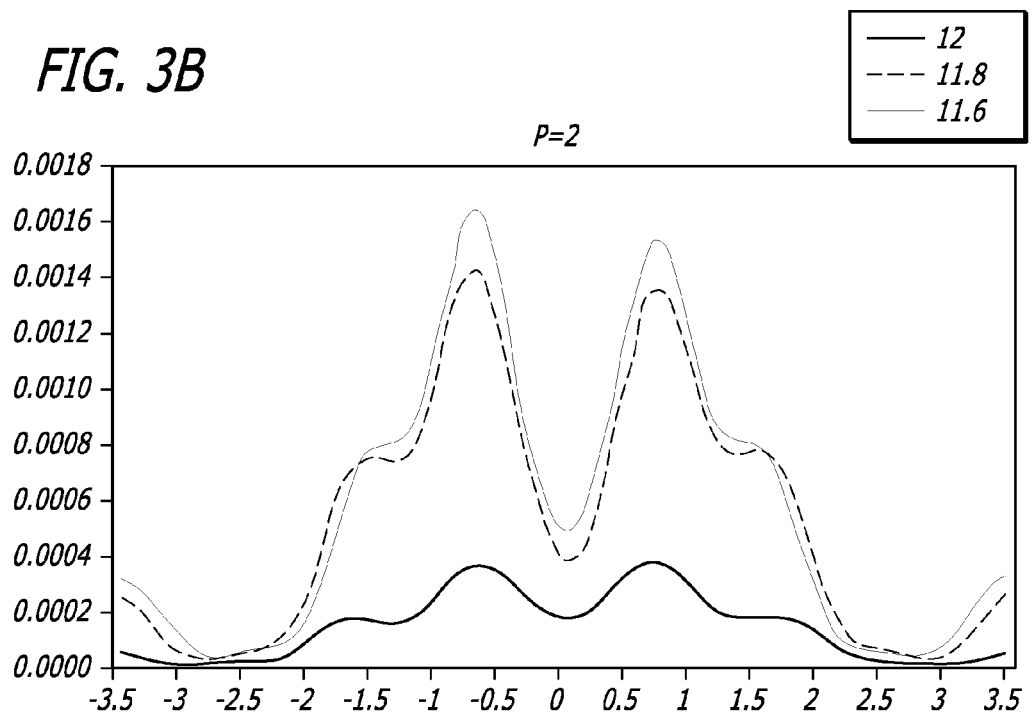

FIGS. 3A and 3B show test data from simulations of the SRIR of FIG. 1, in accordance with at least one embodiment of the present disclosure. For these simulations, software developed for quantum ghost imaging was adapted to simulate the SRIR of the present disclosure. For these simulations, several assumptions were made for the sake of simplicity, but the basic elements were preserved. The vertical axis of the graphs for FIGS. 3A and 3B represents the image intensity, and the horizontal axis represents the transverse image plane (i.e. $x_{is}$).

A dual slit object with slits at −1 and +1 (on the horizontal axis) was illuminated by N number of bursts having M number of pulses. The resulting images are shown for p=1 (i.e. shown in the graph of FIG. 3A) and for p=2 (i.e. shown in the graph of FIG. 3B), where the object Poynting vector is raised to the $p^{th}$ power to form the image. The three curves on each graph correspond to the ancilla beam detector being moved to different focus locations from the radar source. The top curves on each of the graphs represent the intensity of the image in focus. The two lower curves on each of the graphs show the degradation in resolution of the image when the image is out of focus. Although the graphs indicate that the intensity is lower for p=2 (i.e. FIG. 3B) than for p=1 (i.e. FIG. 3A), the visibility for p=2 is much higher than for p=1. This is because the visibility (visibility=V=(Imax−Imin)/(Imax+Imin), where Imax is maximum image intensity and Imin is minimum image intensity) for p=1 is 0.15, and the visibility for p=2 is 0.58. This shows that a higher order p provides an improvement in image visibility.

FIG. 4 shows a table comparing characteristics of quantum optical ghost imaging (GI) with characteristics of the disclosed SRIR. In this figure, it is shown that for the disclosed SRIR a single RF pulse corresponds to an entangled optical photon for quantum optical ghost imaging. The RF pulse dithering of M pulses to cover the object within the burst by the SRIR is achieved in quantum optical ghost imaging by the dithering of the photon with a finite length crystal. The multiple RF bursts where the ancilla beam detector location is shifted between bursts for the SRIR corresponds to the scanning of the optical ancilla beam detector for quantum optical ghost imaging. Digital post processing by the SRIR to perform cross correlation of the RF Poynting vectors from the object and ancilla beam pulses corresponds to the optical coincidence counter detecting the entangled photons from the object and ancilla beam for quantum optical ghost imaging. Raising the Poynting vector from the object to the $p^{th}$ power in performing the RF cross-correlation of the Poynting vectors from the object and ancilla beams for SRIR corresponds to using p number of entangled photons to form the optical quantum ghost image. The image resolution of the SRIR and quantum optical ghost imaging systems are both proportional to 2 p. Quantum optical ghost imaging provides improvement in the signal-to-noise (SNR) ratio, while the SNR improvement afforded by SRIR is still under investigation.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A super-resolution imaging radar (SRIR), the SRIR comprising:
   a pulse signal generator,
   wherein the pulse signal generator propagates N number of bursts of radio frequency (RF) energy,
   wherein each burst contains M number of dithered pulses,
   wherein the pulses are propagated towards an object of interest and an ancilla beam detector;
   an array bucket detector, wherein the array bucket detector collects pulses that are reflected from the object;
   the ancilla beam detector, wherein the ancilla beam detector scans in a direction of the dithered pulses and collects the dithered pulses; and
   a coincidence circuit, wherein the coincidence circuit calculates a cross-time correlation function from the pulses that are collected by the array bucket detector and the ancilla beam detector,
   and wherein the coincidence circuit sums cross-time correlation function results to generate pixels of an image of the object.

2. The SRIR of claim 1, wherein the M number of dithered pulses sequentially illuminate the object.

3. The SRIR of claim 1, wherein the N number of bursts is inversely proportional to the granularity of the image of the object.

4. The SRIR of claim 1, wherein the array bucket detector comprises a plurality of RF antenna elements.

5. The SRIR of claim 1, wherein Poynting vectors of the reflected pulses that are collected by the array bucket detector are stored in digital form.

6. The SRIR of claim 5, wherein the cross-time correlation function is computed using the data that is stored in digital form.

7. The SRIR of claim 1, wherein the cross-time correlation function is related to an image pixel intensity at a specific scanning location of the ancilla beam detector.

8. The SRIR of claim 1, wherein the ancilla beam detector is virtual.

9. The SRIR of claim 1, wherein the pulses are reflected from the object to the array bucket detector through a lens.

10. The SRIR of claim 1, wherein the pulses are propagated to the ancilla beam detector through a lens.

11. A method for extracting super-resolution images, the method comprising:
    providing a super-resolution imaging radar (SRIR),
    wherein the SRIR comprises a pulse signal generator, an array bucket detector, an ancilla beam detector, and a coincidence circuit;
    propagating, with the pulse signal generator, N number of bursts of radio frequency (RF) energy,
    wherein each burst contains M number of dithered pulses,
    wherein the pulses are propagated towards an object of interest and the ancilla beam detector;
    collecting, with the array bucket detector, pulses that are reflected from the object;
    scanning the ancilla beam detector in a direction of the dithered pulses;
    collecting, with the ancilla beam detector, the dithered pulses;
    calculating, with the coincidence circuit, a cross-time correlation function from the pulses that are collected by the array bucket detector and the ancilla beam detector; and
    summing, with the coincidence circuit, cross-time correlation function results to generate pixels of an image of the object.

12. The method of claim 11, wherein the M number of dithered pulses sequentially illuminate the object.

13. The method of claim 11, wherein the N number of bursts is inversely proportional to the granularity of the image of the object.

14. The method of claim 11, wherein the array bucket detector comprises a plurality of RF antenna elements.

15. The method of claim 11, wherein Poynting vectors of the reflected pulses that are collected by the array bucket detector are stored in digital form.

16. The method of claim 15, wherein the cross-time correlation function is computed using the data that is stored in digital form.

17. The method of claim 11, wherein the cross-time correlation function is related to an image pixel intensity at a specific scanning location of the ancilla beam detector.

18. The method of claim 11, wherein the ancilla beam detector is virtual.

19. The method of claim 11, wherein the pulses are reflected from the object to the array bucket detector through a lens.

20. The method of claim 11, wherein the pulses are propagated to the ancilla beam detector through a lens.

* * * * *